US005706514A

United States Patent [19]
Bonola

[11] Patent Number: 5,706,514
[45] Date of Patent: Jan. 6, 1998

[54] DISTRIBUTED EXECUTION OF MODE MISMATCHED COMMANDS IN MULTIPROCESSOR COMPUTER SYSTEMS

[75] Inventor: Thomas J. Bonola, Houston, Tex.

[73] Assignee: Compaq Computer Corporation, Houston, Tex.

[21] Appl. No.: 610,027

[22] Filed: Mar. 4, 1996

[51] Int. Cl.⁶ ............................................. G06F 9/00
[52] U.S. Cl. ...................... 395/674; 395/675; 395/800; 364/230.3; 364/230.4; 364/232.9
[58] Field of Search ................... 395/200.03, 200.05, 395/290, 379, 670–676, 800

[56] References Cited

U.S. PATENT DOCUMENTS

| | | | |
|---|---|---|---|
| 4,394,727 | 7/1983 | Hoffman et al. | 395/673 |
| 5,283,897 | 2/1994 | Georgiadis et al. | 395/675 |
| 5,301,324 | 4/1994 | Dewey et al. | 395/675 |
| 5,485,624 | 1/1996 | Steinmetz et al. | 395/200.05 |
| 5,590,284 | 12/1996 | Crosetto | 395/200.05 |
| 5,590,328 | 12/1996 | Seno et al. | 395/675 |

*Primary Examiner*—Lance Leonard Barry
*Attorney, Agent, or Firm*—Pravel, Hewitt, Kimball & Krieger

[57] ABSTRACT

A technique for handling processor mode mismatched instructions or commands encountered by a CPU within a multiprocessor computer system. During thread execution, if a multimode processor encounters a command or instruction that it cannot execute without shifting modes or mode emulation, it will look for an alternate processor present in the computer system to instead handle the mode mismatched command. If a suitable alternate is found, necessary input parameters including mode reconfiguration information are downloaded to a common memory area accessible to all processors in the system, and the alternate processor is loaded with the starting address of the code that will handle the mismatched command/instruction. The originating processor may suspend thread execution until the alternate processor completes execution. When complete, the alternate processor downloads the results to common memory, and signals its status to the originating processor. Thereafter, the originating processor uploads the results and resumes thread execution if previously suspended.

7 Claims, 6 Drawing Sheets

DISTRIBUTED EXECUTION OF MODE MISMATCHED COMMANDS IN MULTIPROCESSOR COMPUTER SYSTEMS

BACKGROUND OF THE INVENTION

1. Field of the Invention

This invention relates to multiprocessor or computer systems, and more particularly to techniques allowing a host CPU to offload tasks incompatible with the host CPU's current mode operation to one or more slave CPUs having resources and mode configuration necessary to carry them out.

2. Description of the Prior Art

Many popular personal computers are based on the Intel Corporation (Intel) 8086 family of includes the 8088, the 8086, the 80186, the 80286, the 80386, the 80486 and, most recently, the Pentium and Pentium Pro microprocessors. These complex instruction set microprocessors have been designed for upward compatibility, i.e. programs written for the 16-bit 8088/8086 can be run on the 80286, 80386, 80486, Pentium or Pentium Pro processors. For purposes of this disclosure, the upwardly compatible series of Intel processors and other processors which include the instruction set of these processors is hereinafter referred to as the Intel x86 family of microprocessors. Also, for the purposes of this disclosure, the 8088 and 8086 may be considered functionally equivalent and will henceforth be referred to as "the 8086". In addition, the 80386, the 80486, the Pentium and the Pentium Pro are considered functionally equivalent and will henceforth be referred to as "the 80386".

The first generation of the Intel x86 microprocessor family, the 8086 and 8088, made its entry with the 1981 introduction of the IBM PC from International Business Machines Corp. It became an immediate commercial success, which spurred a flurry of compatible units incorporating 8086 or 8088 microprocessors. In time, the PC architecture became the de facto standard for the multibillion dollar personal computer market. Likewise, MS-DOS, the PC's primary operating system, found immediate and widespread use throughout the world. This amounted to an enormous amount of software being developed to run on 8086 class machines is running MS-DOS.

However, the 8086's limitations were soon realized as system memory became cheaper and the users became more sophisticated. The 8086 could only directly address 1 Megabyte of memory organized into a collection of static 64 KB segments, and offered no real multithreaded multitasking capabilities or hierarchical tasking schemes. Thus, in 1983, Intel introduced the 80286 to address some of its predecessor's shortcomings. The Intel 80286 offered several new capabilities, the most powerful of which included the ability to operate in different modes—real and protected. In real mode, the 80286 functioned very much like a fast 8086 and could run MS-DOS and applications originally developed for the 8086 without modification. But this also meant that, while in real mode, the 80286 shared the 8086's limitations as well. Protected mode permitted full utilization of the 80286's advanced addressing and multitasking capabilities, but backwards compatibility with the 8086 and MS-DOS was sacrificed. Further, once in protected mode, the 80286 could only toggle back to real mode through processor reset. Thus, the 80286's protected mode benefits went largely unexploited by PC software designers.

Intel finally overcame these limitations with the 80386 series microprocessors. Like the 80286, the 80386 offered both real and protected mode operation, but offered even more advanced addressing and data transfer capabilities. Also, privilege levels (known as rings, with ring 0 being the highest and ring 3 being the lowest) could be assigned to the operating system and applications to enhance memory fault protection and regulate access to system services during multitasking operations. Most importantly, the is 80386 could emulate an 8086 while remaining in protected mode, through virtual 8086 (V86) emulation. MS-DOS itself or other real mode applications could be invoked as a V86 task subservient to the protected mode kernel. With such protection schemes and a 4 Gigabyte dynamically allocable memory space, the 80386 could multitask several V86 threads with ease and could execute them concurrently with protected mode tasks. A more detailed description of the Intel x86 product evolution and a comparison of each microprocessor's capabilities can be found in U.S. Pat. No. 5,303,378 titled "Reentrant Protected Mode Kernel Using Virtual 8086 Mode Interrupt Service Routines" which is incorporated herein by reference.

The 80386's protected mode allows advanced operating systems and application programs to unlock the full potential of the 80386 and its progeny. However, due primarily to incompatible addressing methods, protected mode still does not support MS-DOS, the dominant PC operating system, as a native application. Therefore, code executing in protected mode cannot use most BIOS level service routines and MS-DOS software interrupts and must instead rely on slow software emulation when such services are required or utilized lengthy reflection techniques.

V86 tasks executing on the 80386 are even further removed from system services and hardware. MS-DOS based programs, many of which were authored before the advent of the 80386, typically presume exclusive access to BIOS and system input/output, and frequently invoke real mode services, to carry out their functions. To integrate these programs into protected mode's hierarchical multitasking environment, system designers deny the V86 tasks direct access to most BIOS level calls and DOS software interrupts. Otherwise, they could preempt access to limited system resources without respecting protected mode privilege hierarchies. All calls are trapped, arbitrated and emulated by a protected mode Virtual DOS Monitor (VDM) without interfacing to MS-DOS itself. The VDM is also responsible for interrupt reflection activities which notify isolated V86 tasks of system changes. The VDM is successful in emulating these calls, but the additional processing steps required exact a severe performance penalty in comparison to true real mode operation. Plus, the VDM must be preloaded by the protected model kernel, typically from disk, before any V86 threads may begin. And, such emulation imposes an extra code management burden which depends on compatibility factors independent of application in which emulation is needed.

Alternatively, the 80386 can support low level BIOS and MS-DOS services by falling back into real mode. But, as discussed above and in U.S. Pat. No. 5,303,378, the transition back to real mode disables all protected mode features, leaving the microprocessor to operate merely as a fast 8086. Even a momentary transition disrupts access to memory beyond 1 MB and disable most multitasking protection mechanisms, which could lead to undesirable thread suspension or termination or data corruption, even if extensive mode saving stack operations are utilized. Also, the protected mode memory map must be reinitialized upon reentry into protected mode, which adds critical steps and clock cycles to servicing any real mode request.

Therefore, it would be desirable to utilize features and system resources accessible to a particular microprocessor mode without resorting to slow software emulation or altering the current mode of the 80386 system microprocessor.

SUMMARY OF THE INVENTION

The present invention involves the addition of at least one microprocessor, hereinafter referred to as the slave microprocessor or slave, connected to the 80386 microprocessor serving as the system CPU, hereinafter referred to as the host microprocessor or host, such that interprocessor communications may be exchanged therebetween. Preferably, one or more dedicated lines emanating from the host processor will be electrically connected to the hardware interrupt line circuitry or interprocessor communication ports of the slave microprocessors to permit task supervision by the host. Other interconnections maintained by the slave microprocessors should mimic those between the host and the remainder of the computer system and the slave microprocessors will be integrated into the computer system in a known manner such that they can access the same memory or input/output at the same addresses as that specified for the host microprocessor.

The slave microprocessor(s) will be used to offload software interrupt handling and other mode specific commands encountered by the host microprocessor when the host is not in the right mode to execute the instruction. More specifically, if a command is encountered by the host microprocessor which cannot be serviced because of the host's current mode, the host will attempt to find an "available" slave microprocessor capable of carrying out the command. This can include polling the current status of the slave microprocessors) for status and mode configuration. If no slave microprocessors are available, the host defaults to processing the command in a conventional manner through software emulation or temporary mode transition. However, if a suitable slave can be appropriated, the host claims it for executing the command. The host fills the selected slave's registers with the information necessary to complete the command, including the starting address of the code needed to carry out the desired command, all necessary input parameters (passed by reference or by value), and memory locations) where the results may be stored. If needed, the host will also reconfigure the selected multimode slave for proper operating mode.

Once all necessary information has been loaded and the slave mode conditionally reconfigured, the host instructs the selected slave to begin execution at the appropriate code address while suspending its own execution of the task. The slave goes on to execute the routine in a conventional manner, and, when complete, uploads the results to the designated memory locations and signals the host. Thereafter, the slave microprocessor suspends execution and waits for the next host mode command mismatch to occur. Meanwhile, upon receipt of the completion signal triggered by the slave, the host uploads the results into its own internal registers and resumes conventional execution of the suspended thread.

The present invention offers distinct advantages over the prior art because no host mode changes or complicated emulation is required to handle the mode mismatched command or instruction. Further, the technique of the preferred embodiment permits the host to temporarily suspend execution of the task in which the mismatch is discovered, allowing the host to address other tasks in the queue while a subservient microprocessor carries out the command. Also, the slave microprocessors need not be multi-mode capable as long as they can otherwise provide register level compatibility with the host microprocessor. Finally, the preferred embodiment illustrates that the present invention is not implementation specific, and can be used whenever the host can communicate with and control one or more slave units also present in the computer system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION PREFERRED EMBODIMENT

Figure 1:
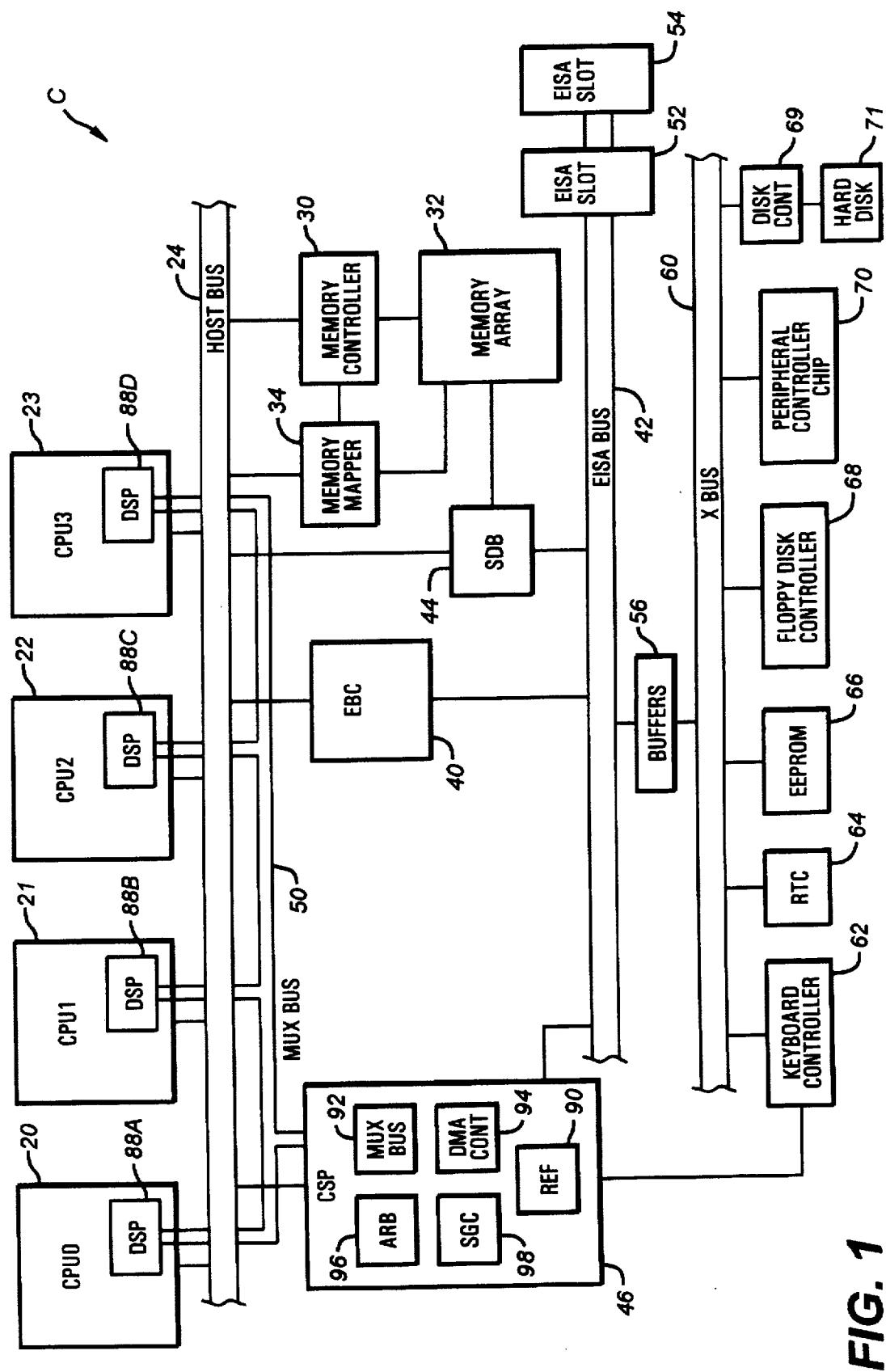
FIG. 1 is a block diagram of the computer system according to the preferred embodiment.

Referring now to FIG. 1, a computer system C is shown which is a multiprocessor system preferably comprising four central processing units (CPUs) in the preferred embodiment, although the present invention may be incorporated into a system having only two CPUs. The elements of the computer system C that are not significant to the present invention other than to illustrate an example of a fully configured computer system are not discussed in detail. Most of the functions and device blocks shown in FIG. 1 are preferably mounted on a system board (not shown). The computer system C preferably includes four CPUs referred to as CPUs 20, 21, 22 and 23, which are connected to a host bus 24. The CPUs 20–23 are referred to as CPUO, CPU1, CPU2 and CPU3, respectively, indicating the preferred logical port assignments. In the preferred embodiment, at least four CPU connectors are provided on the host bus 24 for receiving interchangeable CPU cards 20–23, where the CPUs 20–23 are essentially identical in configuration and function. It is noted that the computer system C is capable of supporting up to a maximum of 8 CPUs. The port assignments are initially determined by the physical slot that a CPU card is plugged into, although logical port assignment is preferably programmable.

A memory controller 30 is coupled to the host bus 24 and also to a main memory array 32, preferably comprising several banks of DRAMs. Memory mapper logic 34 is coupled to the host bus 24, the memory controller 30 and the memory array 32, and provides memory mapping functions to facilitate memory accesses to the memory array 32. The computer system C includes an expansion bus 42 which is preferably the Extended Industry Standard Architecture (EISA) bus, although other types of expansion buses are contemplated. A corresponding EISA bus controller (EBC) 40 is coupled between the host bus 24 and the EISA bus 42. The EBC 40 provides various bus cycle translation and conversion functions to facilitate transfers between the host bus 24 and the EISA bus 42. A system data buffer (SDB) 44 is coupled to the host bus 24, the EISA bus 42 and the memory array 32. The SDB 44 functions to buffer and transfer data between the host bus 24 and the memory array 32, between the host bus 24 and the EISA bus 42, and between the EISA bus 42 and the memory array 32.

A logic block referred to as a central system peripheral (CSP) 46 is coupled to the host bus 24, the EISA bus 42 and is also coupled to a keyboard controller 62. The CSP 46 is preferably coupled through a MUX bus 50 to a logic block referred to as the distributed system peripheral (DSP) 88A in the CPU 20, to a DSP 88B located in the CPU 21, to a DSP 88C located in the CPU 22, and to a DSP 88D in the CPU 23. The MUX bus 50 comprises a plurality of lines for transferring signals between the CSP 46 and the DSPs 88A-D.

The EISA bus 42 includes a plurality of EISA slots 52 and 54 for receiving EISA interchangeable expansion cards such as, for example, network interface or hard disk interface cards. The EISA bus 42 is coupled through buffers 56 to a bus referred to as an X bus 60. A number of peripheral devices are coupled to the X bus 60, including the keyboard controller 62, a real time clock (RTC) 64, an electrically erasable programmable read only memory (EEPROM) 66, a floppy disk controller 68 and a peripheral controller chip 70, which includes numerous ports and UARTs (universally asynchronous receiver/transmitters). The EEPROM 66 contains certain basic operating routines, referred to as the BIOS, to perform power up functions in the computer system C. The power up functions include the initialization of device drivers for the peripheral and I/O devices. The X bus 60 is also coupled to a hard disk controller 69, which provides control and data signals to a hard disk drive 71.

The CSP 46 includes various system functions, including a refresh controller 90, a MUX bus interface 92 coupled to the MUX bus 50, a direct memory access (DMA) controller 94, an EISA or central arbitration controller (CAC) 96 and other miscellaneous system board logic functions which are generally referred to as the SGC 98. The refresh controller 90 controls the refresh of the DRAMs in the memory array 32, and the DMA controller 94 controls direct memory accesses to the memory 32 by the peripheral and I/O devices. The MUX bus interface 92 receives various interrupt request signals IRQ3-IRQ12, IRQ14 and IRQ15 from the various peripheral and I/O devices. The MUX bus interface 92 then transmits corresponding interrupt request signals to the DSPs 88A-D via the MUX bus 50. The SGC 98 in the CSP 46 includes the CPU restart logic and force A20 logic and asserts corresponding RSTAR and LOW A20 signals, which are provided to the MUX bus 50.

Other miscellaneous transfers are required to inform the DSPs 88A-D of the occurrence of several miscellaneous events within the CSP 46. Both the assertion and deassertion of these events are transferred on the MUX bus 50. Upon power up, the computer C automatically determines which CPUs are installed in available physical CPU slots and assigns logical port numbers. A power up timeout signal is asserted if a CPU does not respond before timeout of a timer indicating that the CPU is not installed.

Figure 2:
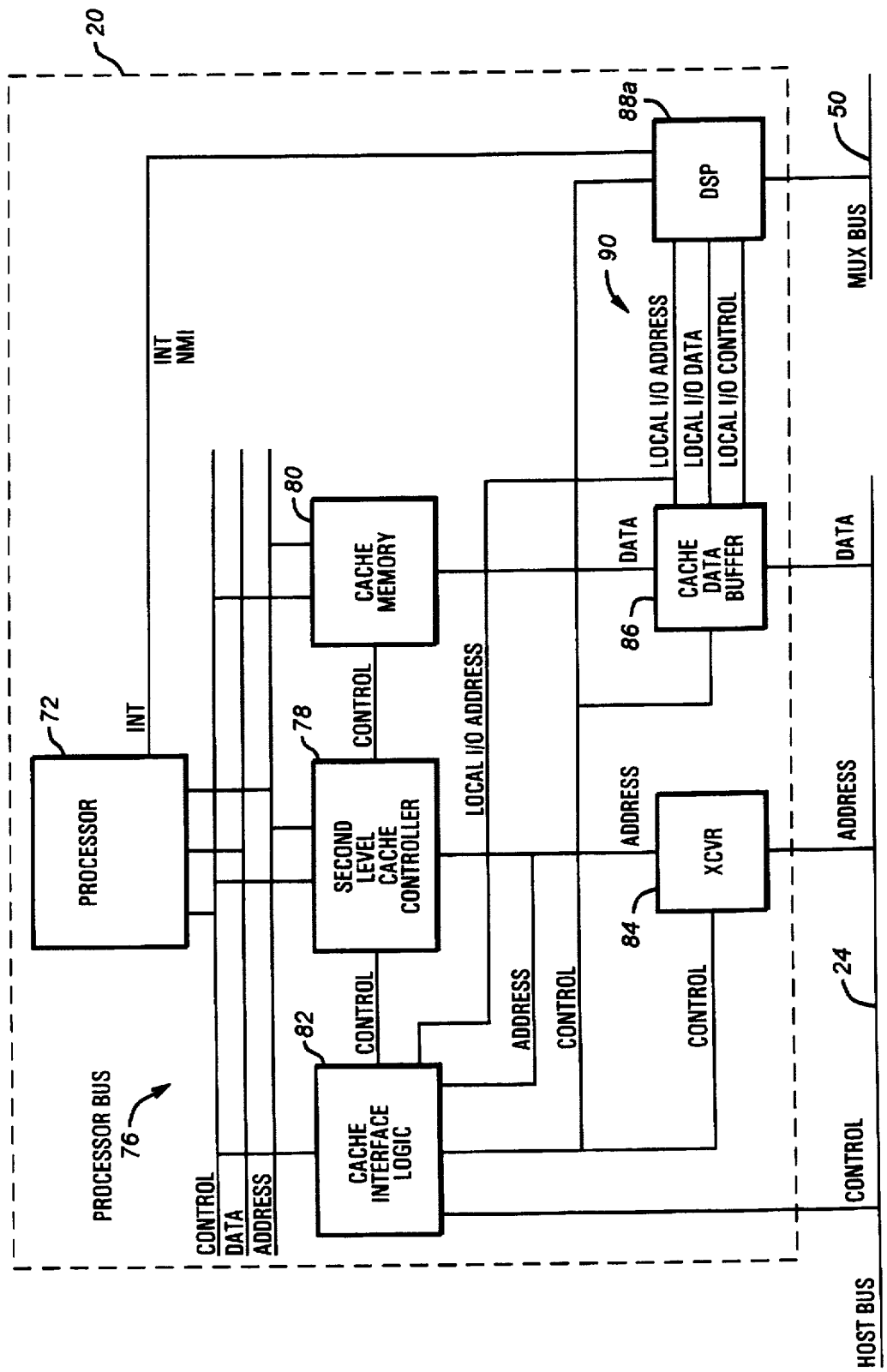
FIG. 2 is more detailed block diagram of the CPU of FIG. 1.

Referring now to FIG. 2, a block diagram of the CPU 20 is shown. The CPUs 20-23 preferably operate in a very similar manner, except that only the CPU 20 generates a memory refresh in the preferred embodiment since it is preferably the host CPU, that is, it is assigned to logical CPU0. The CPU 20 is now described, it being understood that the following description applies also to CPUs 21-23. The CPU 20 includes a processor 72 which is preferably either the Pentium or the 80486 microprocessor from Intel. The processor 72 is coupled to a processor bus 76, which includes control, data and address portions as shown. A second level cache controller 78 is coupled to the address and control portions of the processor bus 76. A cache memory 80 is coupled to the address and data portions of the processor bus 76. The cache controller 78 connects to the cache memory 80 via various control lines to provide a unified writeback and instruction cache which is transparent to system software.

Cache interface logic 82 is coupled to the cache controller 78 through control lines and is coupled to the control portion of the processor bus 76 and the host bus 24. The address pins of the cache controller 78 are connected to a transceiver 84, which in turn is connected to the host bus 24. The address signals provided by the transceiver 84 are also connected to the cache interface logic 82. The data pins of the cache memory 80 are connected to a cache data buffer 86, which is connected to the host bus 24. The cache data buffer 86 is connected to the DSP 88A via a local I/O bus 90 comprising local I/O address data and control lines.

The DSP 88A includes a programmable interrupt controller (PIC), an NMI logic, various timers and a multiprocessor interrupt logic (MPINT). The PIC preferably comprises two cascaded 8-bit interrupt controllers INT-1 and INT-2, each similar to the Intel 8259 to provide 15 levels of interrupts. The INT-1 has inputs IRQ0-IRQ7, where IRQ2 is the cascaded interrupt IRQ2 from INT-2. INT-2 receives inputs IRQ8-IRQ15. The CSP 46 provides the interrupts IRQ1, IRQ3-12 and IRQ14 and IRQ15, as described previously, across the MUX bus 50 to the PIC. The IRQ0 signal is provided by the various timers and provides a system timer interrupt for a time of day, diskette timeout and other system timing functions. The IRQ13 interrupt is shared with a DMA interrupt, a correctable memory error interrupt, a coprocessor error interrupt and several CPU IRQ13 programmable interrupts.

Control, mask, and edge/level control registers are provided in the DSP 88A for each of the interrupt controllers INT-1 and INT-2. Also, an interrupt acknowledge register referred to as the INTA register is accessible by the local CPU via an interrupt acknowledge cycle through the local I/O bus 90. The PIC asserts a signal INT to the CPU 20 if any of these interrupts occur and are not masked.

The NMI logic in the DSP 88A generates an NMI interrupt via a signal NMI to notify the local processor 72 of conditions in the system that need immediate attention before the processor 72 may proceed with its current task.

The MPINT allows CPU interprocessor interrupts (IPIs) and other interrupt sources to be shared at any interrupt level, thus allowing for greater software flexibility in a multiprocessor environment. The MPINT generates interrupt levels MPIRQ0-15, which are generated in response to interprocessor interrupts. Each programmable CPU interrupt may be individually enabled, disabled, set or cleared in any interrupt level through multiprocessor interrupt control/ status ports. The MP interrupt ports are generally referred to as control ports when written to and status ports when read. Each level of interrupt, generally represented by the letter X, is an integer from 0 through 15 excluding level 2, where each of the interrupt levels MPIRQ0-15 has its own MP interrupt control/status port. Predetermined values written to the control ports can thus enable or set an interrupt level MPIRQX to respond to an IPI. The status for each of the interrupt levels X can be obtained by reading the corresponding MP interrupt status port. The processor 72 may access its own MP interrupt ports via a local bus access and may access the MP interrupt ports of other processors through the host bus 24.

Interprocessor interrupts are mapped to interrupt level MPIRQX via a CPU interrupt mask port and a CPU programmable interrupt port. The MP interrupt request outputs (MPIRQX) are ORed with the IRQX inputs within the PIC, thus allowing for the sharing of interprocessor interrupt levels with normal system interrupts.

In the ensuing description, it is assumed that the CPU 20 is the host CPU, although any of the other CPUs 21–23 can be the host. As definitionally only one CPU can be designated as the host, in the following description CPUs 21–23 will be referred to collectively as the slave CPUs.

It is understood that other arrangements of multiprocessor computer systems could be used, with the individual processors arranged in other manners and communicating in different manners.

Figure 3A:
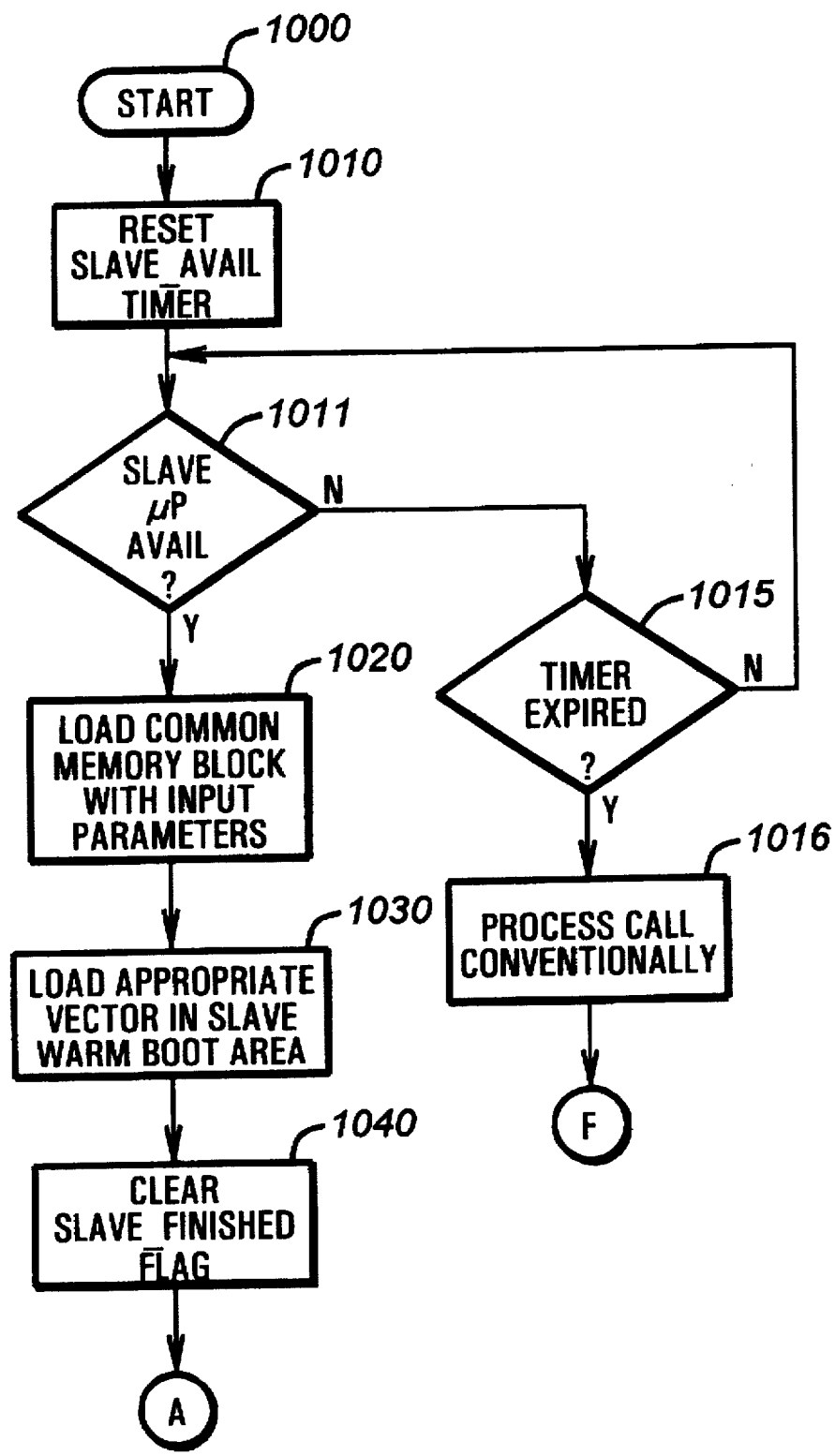
FIGS. 3A-B are a flowchart of the process steps employed by the host microprocessor of the preferred embodiment to offload a mode incompatible command to the slave microprocessor of the preferred embodiment.
Figure 3B:
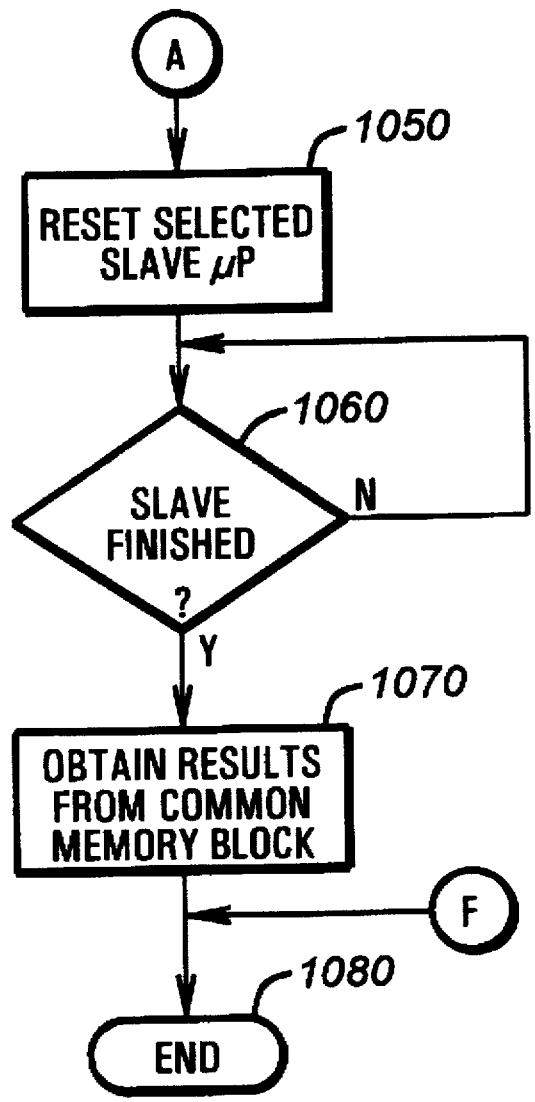

FIGS. 3A–B are a flowchart of the process steps used by the host CPU 20 to offload mode mismatched commands according to the preferred embodiment. As a particular example, FIGS. 3A–B describe how the host CPU 20 initiates a BIOS level INT 13h Disk Driver software interrupt while remaining in protected mode.

During the execution of a thread, the host CPU 20 may encounter an instruction, command or interrupt (hereinafter collectively referred to as command) it cannot process in its current operating mode. According to the preferred embodiment, when such situation develops, execution by the host CPU begins at step 1000. At step 1010, a preferably software-based slave_available watchdog timer is reset to indicate the maximum latency the host should expect to wait for an available slave CPU 21, 22 or 23 before falling back to conventional processing of the mode mismatched command (e.g. through ring and mode transitions or command emulation discussed above). Also, the software timer insures that backward compatibility will be maintained for systems having no slave CPUs adapted for this purpose. Thereafter, control passes to step 1011. At step 1011, a determination is made whether a slave CPU 21–23 is available to offload execution of the mode mismatched command. Preferably, this be will accomplished by polling each slave CPU's multiprocessor interrupt ports for its current mode and activity state described in FIGS. 1 and 2 above. Alternatively, the host CPU 20 could look up the current status of all slave CPUs 21–23 present in the system by means of a lookup table held in a processor status memory block preferably contained within main memory array 32. As with other sections of main memory array 32, this processor status memory block will be accessible to both the host and all slave CPUs. Each slave CPU will be responsible for maintaining its own status entries, including configuration mode (e.g. protected, V86, or real). Other information, such as task priority assignments, calling CPU, etc. could be implemented as is well known in the art. An activity state semaphore, referred to as the slave_finished flag, is used to provide working/idle indications, with the host CPU 20 setting the flag to working state and the slave CPU returning the flag to idle state.

If, in step 1011, a determination is made that no slave CPU 21, 22 or 23 is available to service the command, control transfers to step 1015. At step 1015, a determination is made whether the slave_available software timer has expired. If indeed it has expired, control passes to step 1016. At step 1016, the mode mismatched command is handled conventionally, either through software emulation using a code derivative of the VDM or through ring or mode transition as earlier described.

If, however, in step 1015 it is determined that the slave_available timer has not yet expired, control within this thread passes back to step 1011. It should be recognized that host CPU 20 is preferably an 80386 or better microprocessor offering full multitasking capabilities within an interrupt-driven computer system, so the host may properly suspend execution of the current thread at any point herein described to service a higher priority event or thread as is well known in the art. Thereafter, steps 1011 and 1015 are reiterated until either a slave CPU 21–23 having the necessary mode capabilities becomes available or the slave_available software timer expires.

If a slave CPU 21, 22 or 23 becomes available before the expiration of the slave_available timer, control passes to step 1020. At step 1020, a preferably contiguous block of the main memory array 32 accessible to both the host and all slave CPUs present in the computer system (known as a common memory block) is loaded with parameters necessary to successfully carry out the mode mismatched command on the selected slave CPU 21, 22 or 23. Specifically, in the case of an INT 13h software interrupt according to the preferred embodiment, this common memory block will at least contain the particular BIOS disk service routine to execute which will eventually be loaded into the selected slave CPU's EAX general purpose register and the physical device ID for the target disk or disk array, which will be loaded into the slave's EDX general purpose register. Other memory locations within the block corresponding to other data to be eventually loaded into the selected slave CPU's 21, 22 or 23 registers will be conditionally filled based on the particular disk service routine the host wishes to have executed. Once loading is complete, control passes to step 1030.

At step 1030, FIG. 3A shows that the appropriate starting address for the code necessary to carry out the mismatched command on the selected slave CPU 21, 22 or 23 is written in a known manner to the CS:IP (40:67) warm reset vector memory location. Preferably, the host CPU 20 will obtain the proper starting address from a lookup table or array keyed by desired the slave mode and the mode mismatched command encountered. This will permit automatic reconfiguration of the selected slave when necessary prior to execution of the command. However, jump table or database alternatives known to those ordinary skilled in the art may be used to match the right starting address to the desired command to execute and the desired mode to execute in. Once the warm reset vector is loaded with the appropriate starting code address, control passes to step 1040.

At step 1040, the host CPU 20 clears the slave_finished flag contained in the above-described status or common memory blocks for the selected slave CPU. When this flag is clear, this indicates to the computer system and all CPUs that the selected slave is busy executing a mode mismatched command. Control thereafter passes to step 1050 (FIG. 3B), in which the host CPU 20 resets the selected slave CPU 21, 22 or 23 by asserting an interprocessor interrupt on the selected slave's multiprocessor interrupt port as described in reference to FIGS. 1 and 2 above. Alternative forms of interprocessor communication may be utilized, including waking the selected slave out of sleep mode through writing an appropriate command to the selected slave's MP interrupt port (see FIG. 2) and then instructing it to jump to the appropriate code section placed in the warm reset vector without actually resetting the processor. However, because of the few number of instruction steps interposing the true RESET vector and the warm reset vector and the speed at which a slave CPU may be asynchronously reset, resetting the selected slave CPU provides the best performance for the indicated configuration. After the selected slave CPU 21, 22 or 23 is reset, control passes to step 1060.

At step 1060, a determination is made whether the selected slave CPU has finished execution of the mode mismatched command. Preferably, this determination is made by interrogating the contents of the slave_finished flag. Execution within the current thread suspends until the selected slave CPU 21, 22 or 23 is finished executing the desired command. The host CPU 20 can then execute other threads which may be present. Periodically, the host will poll the appropriate slave_finished flag to see if the current thread can be resumed. Once resumed (i.e., the slave_finished flag is toggled set by the selected slave CPU and is noticed by the host CPU 20), control passes to step 1070.

At step 1070, the host CPU 20 obtains the results computed by the selected slave CPU 21, 22 or 23. Preferably these results are contained in memory locations previously used to store input parameters into specific registers of the selected slave (i.e. passed by reference) as described above to save memory space, although different memory locations may be used to still preserve input parameters. Thereafter, control passes to step 1080, in which conventional execution using the obtained results ensues. This also signifies completion of the mismatched mode command within the host CPU 20 according to the preferred embodiment.

Figure 4A:
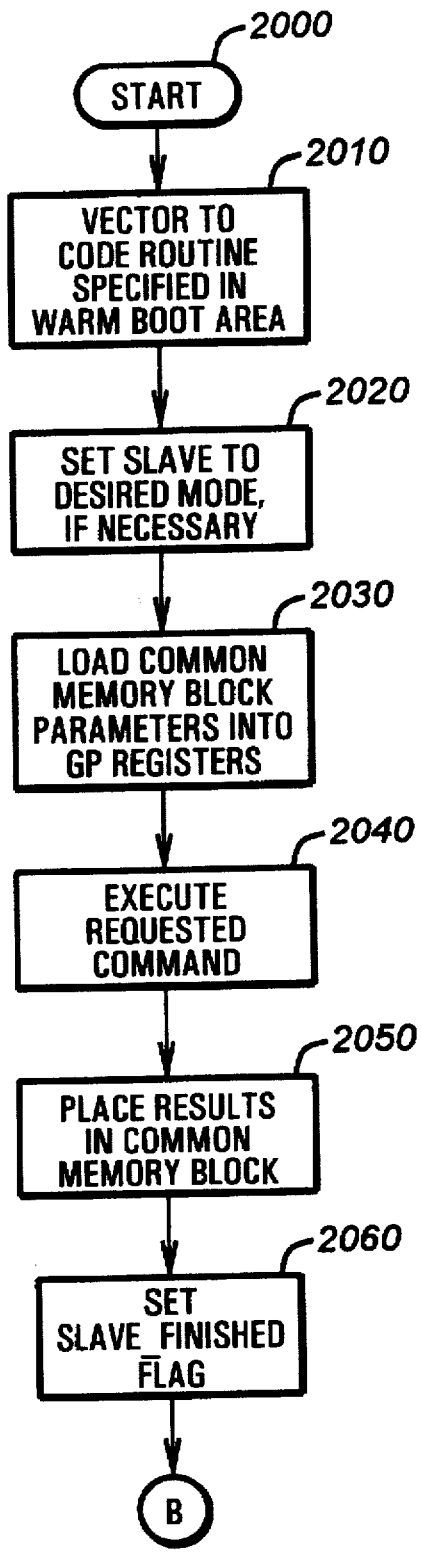
FIGS. 4A-B are a flowchart of the process steps taken by the slave microprocessor of the preferred embodiment in executing the mode mismatched command requested by the host of the preferred embodiment.
Figure 4B:
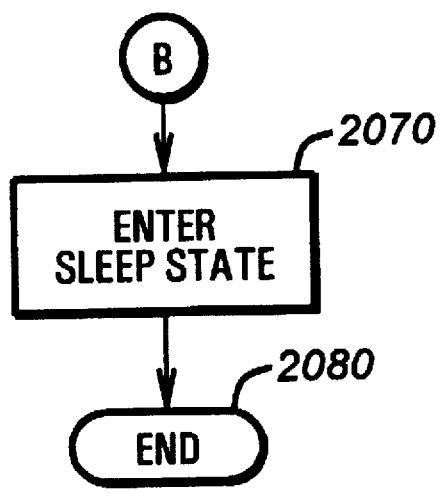

FIGS. 4A-B are a flowchart of the process steps taken by the selected slave CPU 21, 22 or 23 to handle execution of a mode mismatched command encountered by the host CPU. Execution begins at step 2000 with the selected slave CPU 21, 22 or 23 coming out of reset or awakened from sleep from the host, as the case may be. Control then passes to step 2010, wherein the slave CPU vectors to the starting address of the code routine used to handle the desired command. Preferably, the starting address is placed in the warm reset vector location to facilitate interprocessor communications with minimum latency. Other methods and storage locations could be utilized for non-X86 processors or if the processor is awakened other than being reset. Thereafter, at step 2020, the selected slave CPU 21, 22 or 23 switches into the operation mode necessary to carry out the desired command as is well known in the art. It should be noted here, that in the preferred embodiment, all slave CPUs are members of the Intel x86 microprocessor family, and thus come out of the reset state already configured in true real mode. So, when the host CPU 20 executing in protected mode encounters a real mode command it cannot process while in protected mode (in this case, a BIOS level INT 13h disk driver software interrupt), it can simply reset the selected slave CPU without reconditioning the slave's operating mode. Once the selected slave CPU is conditionally mode reconfigured, control passes to step 2030.

At step 2030, the selected slave CPU 21, 22 or 23 downloads input parameters placed by the host CPU 20 into the common memory block and copies them into the appropriate general purpose registers. Thereafter, control passes to step 2040, where the selected slave invokes the appropriate command, instruction or interrupt unable to be processed by the host CPU 20 in a conventional manner execution then passes to step 2050.

At step 2050, the selected slave CPU 21, 22 or 23 places the results of the operation executed in step 2040 preferably into the common memory block. Thereafter, the selected slave sets the slave_finished flag indicating to the host that the slave is finished or idle and the common memory block now contains valid result data. Then, control passes to step 2070 (FIG. 4B). At step 2070, the selected slave CPU 21, 22 or 23 enters an inactive or sleep state to await the next mode mismatch command to be encountered by the host CPU 20. This indicates successful completion of handling a mode mismatch command by a slave CPU 21, 22 or 23 according to the preferred embodiment.

Thus, from the above description of the presently preferred embodiment, processor mode mismatched commands encountered in a multiprocessor computer system may be handled without extensive emulation routines or mode changes by offloading the task to an alternate processor possessing the requisite mode and resources. During execution of a thread, if a multimode host CPU encounters a command or instruction that it normally cannot execute without shifting modes or performing mode emulation, it will look for an alternate CPU present in the system to instead handle it. If a suitable alternate is found, necessary input parameters including mode reconfiguration information are downloaded to a common memory area accessible to all CPUs in the system, and the alternate CPU is loaded with the starting address of the code that will handle the mismatched command/instruction. Thereafter, the host CPU originally encountering the command/instruction suspends execution of the thread until the alternate CPU completes execution. When complete, the alternate CPU uploads the results to common memory, and signals its status to the host CPU. Processing of the mismatched command completes when the host CPU obtains the results from common memory and resumes execution of the suspended thread.

The foregoing disclosures and description of the preferred embodiments are merely illustrative and explanatory thereof, and various changes in the procedures, components, and circuit elements, as well as in the details of the illustrated circuitry and method of operation may be made without departing from the spirit of the invention.

What is claimed is:

1. A method for operating a muliprocessor system, the multiprocessor computer system including a multimode first processor capable configured for operations in a first processing mode, a second processor capable of being configured for operations in a second processing mode incompatible with said first processing mode, means for storing a code vector, and means for storing data and command parameters accessible to both said first and second processors, a method for processing said command encountered by said first processor which cannot be executed while said first microprocessor is in said first processing mode, the method comprising the steps of:

said first processor determining whether said second processor is available for processing said command; and if said second processor is available for processing said command, said first processor offloading said command to said second processor, said offloading steps comprising:

said first processor downloading data and command parameters required for successful processing of said command to said storing means;

said first processor placing a code vector pointing to source code necessary to complete processing of said command in said code vector storing means;

said first processor activating said second processor;

said second processor utilizing said stored data and command parameters and said stored code vector to commence processing of said command;

said second processor storing results obtained from processing said command to said data and command parameters storage means;

said second processor notifying said first processor when said command processing is complete; and said first processor uploading said stored results for use in a subsequent task when said second processor notification is received.

2. The method of claim 1, further comprising the steps of:

said second processor entering an active state upon completion of said activating step; and said second processor entering a sleep state upon completion of said notifying step.

3. The method of claim 2, wherein said second processor availability determining step comprises:

said first processor testing whether said second processor is in said sleep state; and said first processor determining that said second processor is available for processing said command if said second processor is in said sleep state.

4. The method of claim 2, further comprising the step of:

said first processing setting a semaphore stored in said data and command parameter storage means prior to activating said second processor; and wherein said second processor resets said semaphore stored in said data and command parameter storage means when said second processor notifies said first processor when said command processing is complete.

5. The method of claim 4, wherein said second processor availability determining step comprises the steps of:

said first processor testing whether said second processor is in said sleep state by interrogating said semaphore; and said first processor determining that said second processor is available for processing said command if said second processor is in said sleep state.

6. The method of claim 1, wherein said command is encountered by said first processor while said first processor is executing a thread.

7. The method of claim 6, further comprising the steps of:

said first processor suspending execution of said thread after said activating step; and said first processor resuming execution of said thread after said first processor result uploading step.

* * * * *